United States Patent [19]
Komatsu et al.

[11] Patent Number: 4,796,120
[45] Date of Patent: Jan. 3, 1989

[54] MAGNETIC TAPE DRIVE MACHINE

[75] Inventors: Fumito Komatsu; Tuneo Tezuka; Akiyoshi Toyama; Kiyoharu Iwanami, all of Nagano, Japan

[73] Assignee: Kabushiki Kaisha Sankyo Seiki Keisakusho, Nagano, Japan

[21] Appl. No.: 26,922

[22] Filed: Mar. 17, 1987

[30] Foreign Application Priority Data

Mar. 17, 1986 [JP] Japan .................................. 61-56782
Nov. 7, 1986 [JP] Japan .................................. 61-265004

[51] Int. Cl.⁴ ........................ G11B 15/00; G11B 5/54
[52] U.S. Cl. ...................................... 360/96.5; 360/105
[58] Field of Search .................... 360/105, 93, 96.5; 242/197-200

[56] References Cited

U.S. PATENT DOCUMENTS 4,573,091 2/1986 Barton, Jr. et al. .
4,636,890 1/1987 Rudi .............................. 360/105 X

FOREIGN PATENT DOCUMENTS 213056 12/1984 Japan .
123048 6/1986 Japan .

Primary Examiner—A. J. Heinz
Attorney, Agent, or Firm—Sughrue, Mion, Zinn, Macpeak, and Seas

[57] ABSTRACT

A tape drive for a tape cartridge having a protective cover at one corner thereof. The tape cartridge is inserted with the protective cover on the inner end. The protective cover is opened at the back of the drive. Then, a door on the drive is closed which first causes a magnetic head to move vertically along a width of the tape to confront the type and then causes the cartridge to slide laterally into the magnetic head.

11 Claims, 5 Drawing Sheets

MAGNETIC TAPE DRIVE MACHINE

BACKGROUND OF THE INVENTION

1. Field of the Invention

The present invention relates to a magnetic tape drive machine, and it particularly relates to a machine for driving a magnetic tape appropriate to a tape cartridge for backing up a magnetic disk unit.

2. Field of the Invention

A well known type of tape cartridge for backing up a magnetic disk comprises a drive belt for rotating a pair of reels as well as a protective cover which functions to expose a part of a magnetic tape to bring a magnetic head into sliding contact with the exposed part of the tape only when the tape cartridge is loaded in a prescribed recording/reproduction position. The protective cover extends along only a fraction of the long edge of the cartridge and rotates in the plane of the cartridge. In a tape drive machine employing such a tape cartridge, a cartridge loading mechanism, a magnetic head moving mechanism and so forth are simplified if the cartridge is inserted in the direction of the width of the tape drive machine. In that case, however, since the width of the tape cartridge needs to be not less than the length of the cartridge, the width of the tape drive machine is made larger than that of the magnetic disk unit which is combined with the machine.

For that reason, a magnetic tape drive machine has been proposed in which a tape cartridge is loaded in the longitudinal direction of the machine in order to reduce its width. Such magnetic tape drive machines were disclosed in the Japanese Patent Application (OPI) No. 213056/84 (the term "OPI" as used herein means an "unexamined published application"), in the Japanese Patent Application (OPI) No. 45459/86 and in the Japanese Patent Application (OPI) No. 123048/86.

There is a mechanism for bringing a magnetic head and a tape into contact with each other by swinging in the magnetic head on the same plane as a cartridge to put the head into contact with the tape such as that disclosed by Barton et al in U.S. Pat. No. 4,573,091. However it is hard to achieve an adequate amount of swing within the magnetic head within a limited width. The magnetic head is thus necessarily located near a cartridge insertion passage. As a result, it is likely that the cartridge hooks the magnetic head when the cartridge is inserted.

In the magnetic tape drive machine disclosed in the Japanese Patent Application (OPI) No. 213056/84, a cartridge is put on a tray and conveyed into the machine in order not to come into contact with a magnetic head. For that reason, the construction of the machine is complicated. As for a cartridge of such kind, a protective cover needs to be opened along with the insertion of the cartridge into the machine. A construction for opening the protective cover is also complicated.

In the magnetic tape drive machine disclosed in the Japanese Patent Application (OPI) No. 45459/86, a direct drive system is adopted in order to prevent the fluctuation in the speed of movement of a magnetic tape. A cartridge is inserted into the machine as the protective cover of the cartridge is located at the outer portion of the cartridge, so that the protective cover is opened. For that reason, a mechanism for opening the protective cover is complicated.

In the magnetic tape drive machine disclosed in the Japanese Patent Application (OPI) No. 123048/86, a cartridge is inserted with its protective cover located at the inner portion of the cartridge. Since its magnetic head needs to be moved through a long distance not to hinder the opening and closing of a protective cover, a mechanism for moving the magnetic head is complicated and a large space is required for the movement of the magnetic head. Since the mechanism precludes the adoption of a direct drive system, a capstan motor is provided in a more internal position than the magnetic head to drive a capstan in a belt drive system.

SUMMARY OF THE INVENTION

The present invention was made in order to solve the above-described problems. Accordingly, it is a first object of the present invention to provide a magnetic tape moving mechanism in which a magnetic head does not obstruct the insertion of a cartridge even if the width of a magnetic tape drive machine is reduced in accordance with the dimensions of a magnetic disk unit which is combined with the tape drive. The whole construction of the tape drive should not be complicated.

It is a second object of the present invention to provide a magnetic tape drive machine in which a mechanism for opening and closing the protective cover of a cartridge is simplified by making it possible to insert the cartridge along its longitudinal dimension as the protective cover is located at the inner portion of the cartridge and in which a magnetic head movement space is reduced.

It is the third object of the present invention to reduce the amount of magnetic head movement to obtain space for installation of a motor which is a direct drive motor.

The present invention is characterized in that a magnetic head is provided so as to be movable along the direction of the width of a magnetic tape and to be moved to a position not facing a cartridge while the cartridge is being inserted and discharged.

The present invention is also characterized in that the magnetic head is located in a more interior position than a magnetic tape drive motor with respect to a cartridge insertion port.

The cartridge is inserted and discharged as the magnetic head remains at a removed standby position not facing the cartridge. The magnetic head is moved along the direction of the width of the magnetic tape after the cartridge is loaded so that the magnetic head faces the cartridge. Since the magnetic head is moved along the direction of the width of the magnetic tape, a tape drive motor does not obstruct the movement of the magnetic head. Finally, the cartridge is moved toward the head to have the head contact the tape.

DETAILED DESCRIPTION OF THE PREFERRED EMBODIMENTS

An embodiment of the present invention, which is magnetic tape drive machine, is hereafter described with reference to the drawings attached hereto.

Structure

Figure 1:
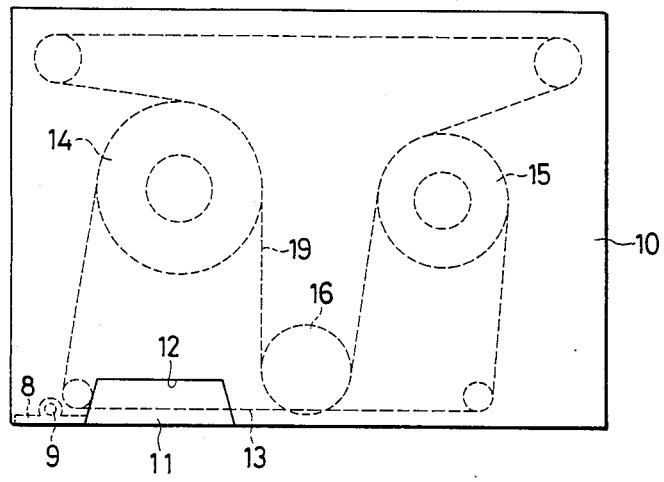
FIG. 1 shows a plan view of a tape cartridge used in a magnetic tape drive machine which is an embodiment of the present invention.

FIG. 1 shows a conventional tape cartridge 10 which is used with the embodiment of the invention. A protective cover 11 is provided at a longitudinal side edge of the cartridge 10 near one of its end so that the protective cover 11 can be turned about a shaft 9 perpendicular to the large face of the cartridge 10 to open and close a magnetic head insertion opening 12. The protective cover 11 is biased in such a direction as to turn to close the opening 12. When a pushed end portion 8 of the protective cover 11 is pushed inwardly (upward as illustrated in FIG. 1), the protective cover 11 is turned against the biasing force to open the opening 12 to thereby expose a part of a magnetic tape 13 housed in the cartridge 10. The magnetic tape 13 is wound on a pair of reels 14 and 15. An endless belt 19 is located in pressure contact with outer circumferential portions of the tape 13 wound on the reels 14 and 15.

A capstan roller 16 rotatably supported in the cartridge 10 is rotated by external means to drive the endless belt 19 to rotate the reels 14 and 15 to run the tape 13.

FIGS. 2 through 13 show an embodiment of the invention which is a magnetic tape drive employing the cartridge 10.

Figure 2:
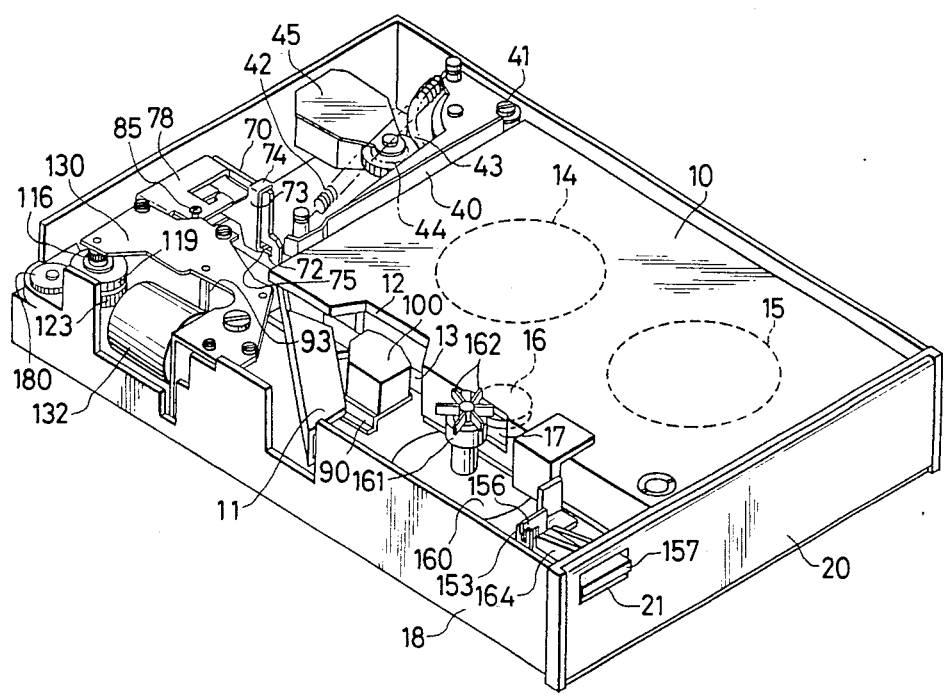
FIG. 2 shows a perspective view of the magnetic tape drive machine.
Figure 8:
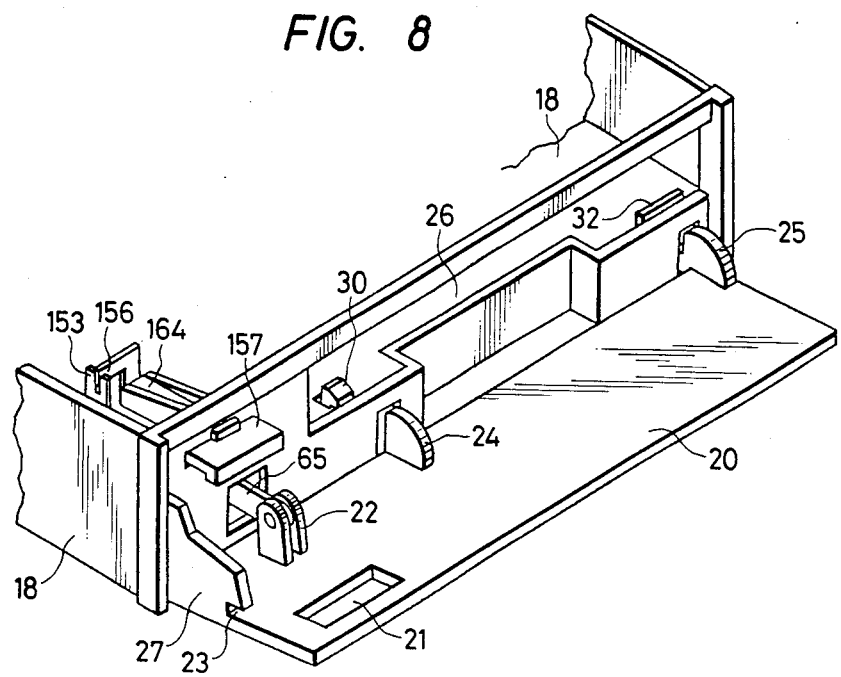
FIG. 8 shows a perspective view of the door opening/closing mechanism of the magnetic tape drive machine.
Figure 9:
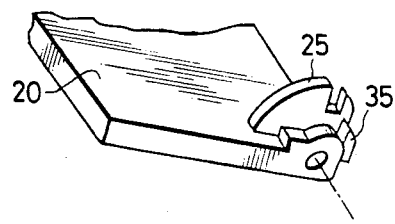
FIG. 9 shows a perspective view of a path of a door seen in a direction different from that in FIG. 8.

As shown in FIGS. 8 and 9, a cartridge insertion port 26 is provided in the front of a frame 18 so that the port 26 is opened and closed by a door 20 rotatably supported about a horizontal shaft to swing between the closed position of FIG. 2 and the open position of FIG. 8. The door 20 has a window 21 for an unlocking button described later. The door 20 is provided with arcuate projections 24 and 25 extending along arcs whose centers of curvature are located on the axis of swinging of the door. The arcuate projections 24 and 25 are located on the bottom portion of the door 20 respectively near its center and at its right-hand end. An edge projection 27 is provided on the bottom portion of the door 20 at its left-hand end. A support 22 for an interlocking shaft 65 is provided on the door 20 at the right of the projection 27. The arcuate projections 24 and 25 function to prevent the discharge of the loaded cartridge 10 and to hinder the closure of the door 20 when the cartridge is incompletely inserted. A notch 23 is formed between the door 20 and the edge projection 27. The notch 23 functions to lock the door 20. As shown in FIG. 9, a projection 35 is provided outside the side arcuate projection 25.

Figure 3:
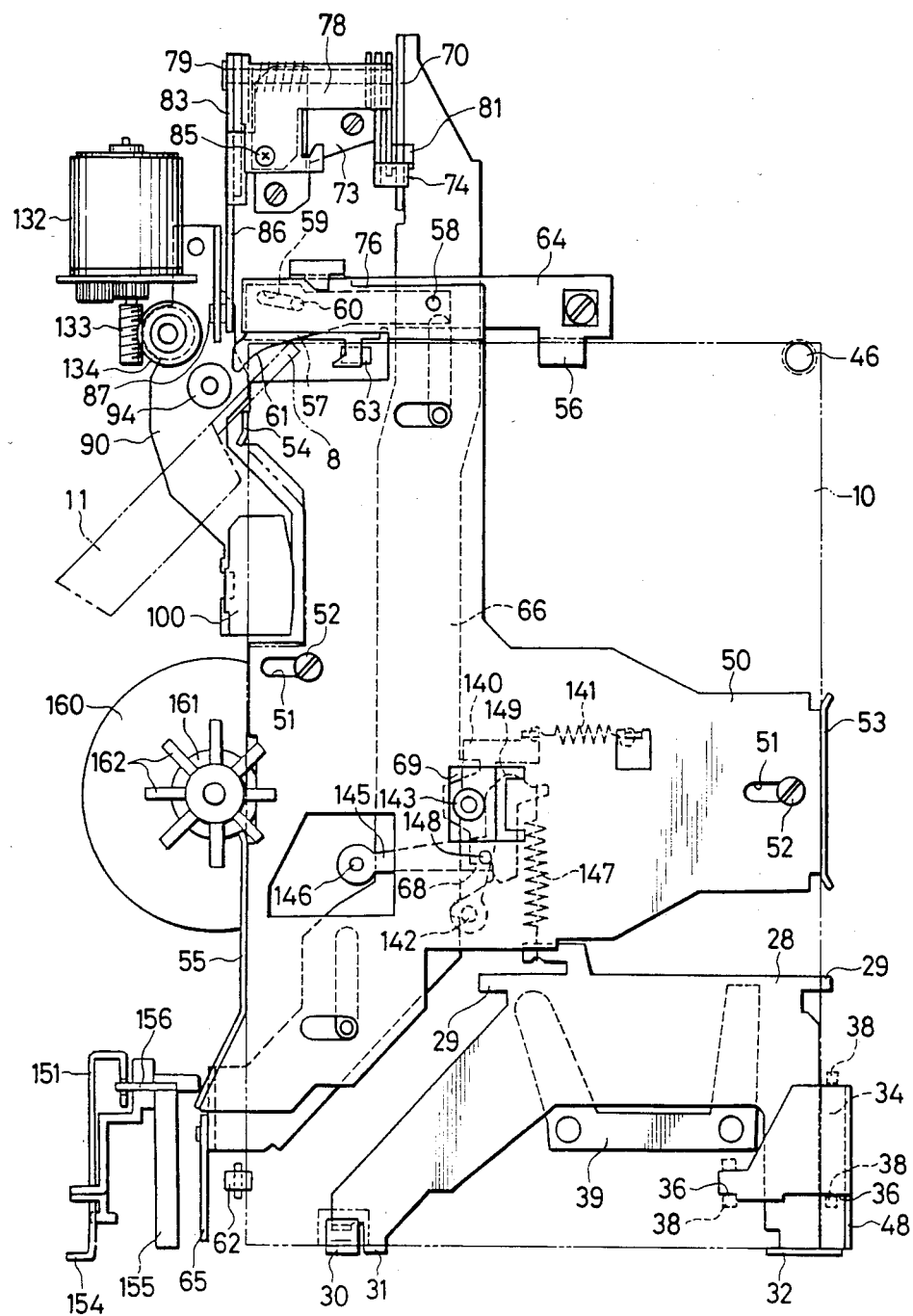
FIG. 3 shows a plan view of the magnetic tape drive machine.

As shown in FIG. 3, an intermediate lever 34 is provided at the bottom portion of the frame 18 and is located at the right-hand portion of the front (bottom in FIG. 3) of the frame 18 near the door 20. The position of the intermediate lever 34 is restricted by a plurality of restriction members 38 provided on the frame 18. The intermediate lever 34 can be turned in a vertical plane about a fulcrum 36 on the front edge of the lever. An arm 48 extends from the right-hand edge of the intermediate lever 34. The projection 35 next to the side arcuate projection 25 shown in FIG. 9 pushes up the arm 48 at the end of the process of opening of the door 20 so as to turn the intermediate lever 34 about the fulcrum 36.

A locking plate 28 is provided at the bottom portion of the frame 18 so that a portion of the locking plate 28 overlies the bottom of the intermediate lever 34. The locking plate 28 is provided with two projections 29 at the inner portion of the plate and is supported at the projections 29 by support portions of the frame 18 so that the locking plate can be turned in a vertical plane about the projections 29. The locking plate 28 has arms extending forward. A locking member 30 is secured to the tip of the left-hand arm of the locking plate 28. The left-hand arm also has a projection 31. A riser 32 is provided at the tip of the right-hand arm of the locking plate 28. The right and left arms of a plate spring 39 secured to the frame 18 are placed in pressure contact with the locking plate 28 to bias the plate 28 to normally be in tight contact with the bottom of the frame 18 to move the locking member 30 into a cartridge insertion passage on the frame.

One end of the rod-like interlocking shaft 65 is pivotally coupled to the interlocking shaft support 22 (refer to FIG. 8) of the door 20. The other end or the interlocking shaft 65 as shown in FIG. 3, is pivotally coupled to one side of the front end portion of a head lift cam lever 66, extending from the front to the back of the tape drive.

Figure 4:
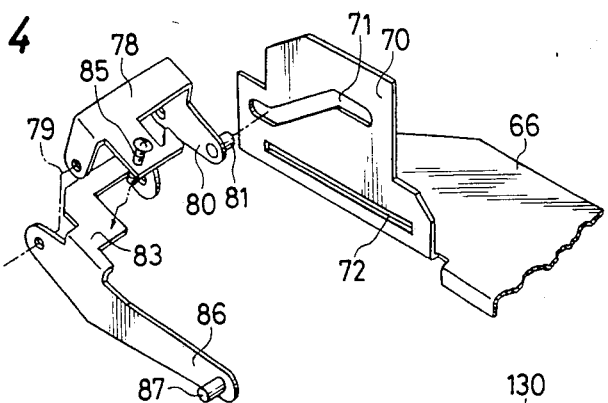
FIG. 4 shows a perspective exploded view of a part of the head moving mechanism of the magnetic tape drive machine.

The head lift cam lever 66 can be slid back and forth near the bottom of the frame 18 along a guide groove extending in a front-to-rear direction of the head lift cam lever 66. A riser 70 is provided at one side edge of the rear end portion of the head lift cam lever 66 extending to the vicinity of the rear end of the frame 18. The riser 70 projects toward the top of the frame 18. As shown in FIG. 4, the riser 70 is provided with a cam groove 71 and a horizontal straight guide groove 72 located thereunder. The cam groove 71 comprises a horizontal groove in an upper front position, another horizontal groove in a lower rear position and an oblique groove connecting the two horizontal grooves to each other.

As shown in FIGS. 3 through 6, a pin 81 at the tip of the arm 80 of a first head lift lever 78 is fitted in the cam groove 71. A bearing plate 73 secured to the frame 18 supports the head lift lever 78 so that the lever can be turned about a horizontal shaft 79.

The bearing plate 73 has bent portions 74 and 75 over under a riser located in a side position. The top bent portion 74 extends along the top of the riser 70 of the head lift cam lever 66 and the bottom bent portion 75 is fitted in the guide groove 72 to guide the movement of the head lift cam lever 66 in a front-to-rear direction.

A second head lift lever 83 is rotatably supported on the shaft 79. A helical spring 84 is wound on the shaft 79 and is engaged at both its ends with the head lift levers 78 and 83 to bias the levers in such directions as to turn them toward each other.

An adjusting screw 85 is threaded in the first head lift lever 78. The tip of the adjusting screw 85 is located in contact with the top the second head lift lever 83 by the biasing force of the spring 84 so that both the head lift levers 78 and 83 will rotate together. The distance between the head lift levers 78 and 83 is appropriately set by the adjusting screw 85.

An arm 86 extends forward from one side of the second head lift lever 83. A pin 87 is secured to the tip of the arm 86 and, as shown in FIGS. 5 and 6, is fitted in a slender hole 92 of a riser 91 located at one side edge of the rear end of a head plate 90.

Figure 5:
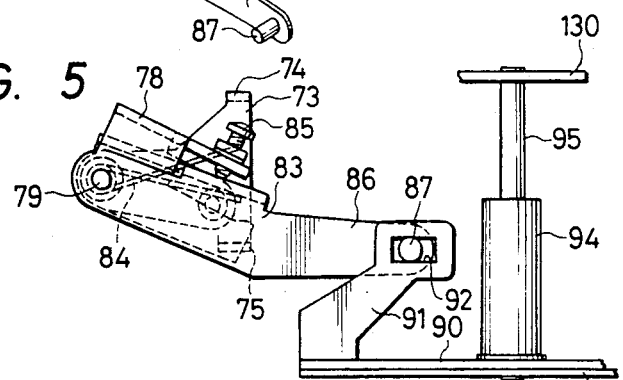
FIG. 5 shows a side view of the head moving mechanism.
Figure 6:
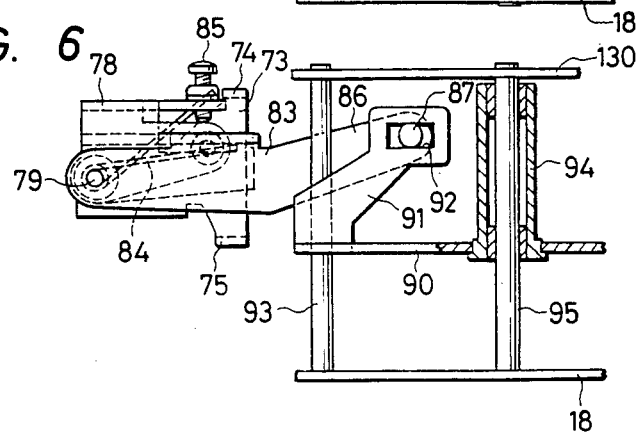
FIG. 6 shows a partially-sectional side view of a modification of the head moving mechanism.

As shown in FIGS. 2, 5 and 6, an auxiliary plate 130 is secured to the frame 18 by an appropriate number of guide shafts 93 and 95 and so forth. The first guide shaft 93 extends through the head plate 90 and the other guide shaft 95 extends through a guide sleeve 94 secured to the head plate 90 so that the head plate 90 can be moved up and down while maintaining a parallel position. A magnetic head 100 is attached to the top of the front end portion of the head plate 90 extending forwardly at the auxiliary plate 130.

Figure 7:
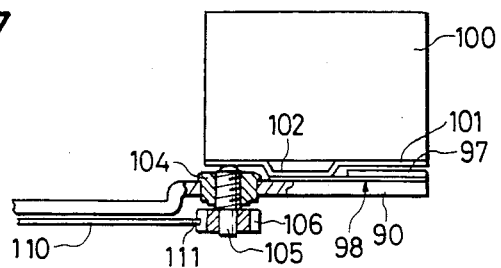
FIG. 7 shows a partially-sectional side view of the magnetic head support mechanism of the magnetic tape drive machine.

A construction for attaching the magnetic head 100 to the head plate 90 is shown in detail in FIG. 7. One end of a plate spring 97 is secured as a cantilever to the head plate 90 by spot welds 98. A head support 101 is secured to the free end of the plate spring 97 by a spot weld 102. The magnetic head 100 is secured to the head support 101 by an appropriate means such as an adhesive. A nut 104 is fitted in the head plate 90 under the head support 101 near the free end of the plate spring 97. An azimuth adjusting shaft 105 is screw-engaged in the nut 104. A gear 106 is press-fitted on the azimuth adjusting shaft 105 under the head plate 90.

As shown in FIG. 3, a projection 68 is provided at the right-hand edge toward the front of the head lift cam lever 66. A slope 69 is provided inside the projection 68 by notching. A pin 148 secured to an auxiliary lever 145 extends upwards in the pathway for the projection 68 of the head lift cam lever 66.

Figure 10:
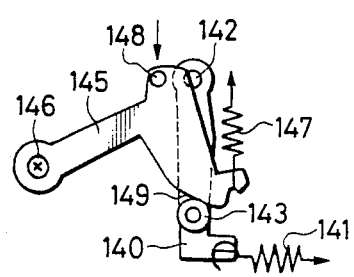
FIG. 10 shows a plan view of the cartridge guide plate translation mechanism of the magnetic tape drive machine.

As shown in FIG. 10, the auxiliary lever 145 is provided so that it can be turned in a horizontal plane about a shaft 146 vertically fixed on the frame 18. As shown in FIG. 3, a spring 147 urges the auxiliary lever 145 to turn it clockwise. The pin 148 is put in contact with the projection 68 of the head lift cam lever 66 caused by the biasing action of the spring 147. The auxiliary lever 145 extends from its pivot across the head lift cam lever 66 along the direction of the width thereof and then squarely turns inward toward the rear of the tape drive. The free end portion of the auxiliary lever 145 is provided with a cam surface 149. A roller 143 is provided on a cartridge guide plate drive lever 140 which faces and abuts the cam surface 149.

The driver lever 140 can be turned about a shaft 142 provided on a cartridge guide plate 50 and extends inward from the shaft 142. A spring 141 of relatively strong resilient force is provided between the drive lever 140 and the cartridge guide plate 50. When the pin 148 on the auxiliary lever 145 is pushed by the projection 68 of the head lift cam lever 66 so that the auxiliary lever is turned counterclockwise, the roller 143 is pushed by the cam surface 149 of the auxiliary lever so that the cartridge guide plate 50 is translated leftward (as illustrated in FIG. 3) against the biasing force of the spring 141. At that time, the roller 143 enters into a notch in front of the slope 69 of the head lift cam lever 66.

As shown in FIG. 3, the cartridge guide plate 50 has an appropriate number of guide holes 51. Guide pins 52 extend through the guide holes 51 and are secured to the frame 18 so that the cartridge guide plate 50 can be translated to the right and to the leftward on the frame 18 within a range determined by the guide holes 51. A cartridge guide 53 is provided at the right-hand edge of the cartridge guide plate 50 by bending it. Other cartridge guides 54 and 55 are provided at the front and rear of the left-hand edge of the cartridge guide plate 50. The cartridge 10 inserted through the insertion port 26 can be held between the cartridge guides 53, 54 and 55 of the cartridge guide plate 50. The plate 50 can be moved rightward and leftward as the cartridge 10 is held among the cartridge guides 53, 54 and 5.

A stopper 64, which acts as a rear limit to the insertion of the cartridge 10, is secured to the frame 18. The stopper 64 is provided with a restriction member 56, which pushes the upper edge of the rear end of the cartridge 10 on the frame 18 to restrict the vertical position of hte cartridge 10.

A ball 46 for smoothly guiding the insertion and rightward and leftward translation of the cartridge 10 is provided in the frame 18 at the inner end of the insertion passage for the cartridge so that the ball can be rotated in al directions. Rollers 62 and 63 are supported near the cartridge insertion port 26 and at the inner end of the insertion passage for the cartridge, respectively for smoothly guiding the rightward and leftward translation of the cartridge 10, so that the roller 62 and 63 rotated around front-to-rear axes.

A bent portion 76 is provided at the inner end of the cartridge guide plate 50 and extends along the stopper 64. A protective cover opening member 57 is supported at the bent portion 76 on a shaft 58 so that the opening member 57 can be turned in a horizontal plane. The free end of the protective cover opening member 57 is provided with an arc-shaped contact surface 61, with which the push end 8 of the protective cover 11 of the cartridge 10 comes into contact. The protective cover opening member 57 has a slightly-inclined cam groove 59 in which a projection 60 provided on the stopper 64 is fitted. When the cartridge guide plate 50 is moved leftward as shown in FIG. 3, the cam groove 59 is moved left relative to the projection 60 to slightly turn the protective cover opening member 57 clockwise to slightly move the contact surface 61 backward from the push end 8 of the protective cover 11 of the cartridge 10.

When the cartridge 10 is moved leftward together with the cartridge guide plate 50 as shown in FIGS. 2 and 3, a capstan 161 of a motor 160 is brought into pressure contact with the capstan roller 16 of the cartridge 10. The capstan 161 is directly driven by the capstan motor 160 attached to the frame 18. The capstan motor 160 has cooling fins 162 integrally provided on the rotary shaft of the motor 160.

The magnetic head 100 is located in a more internal position than the capstan motor 160 with respect to the cartridge insertion port 26.

Figure 13:
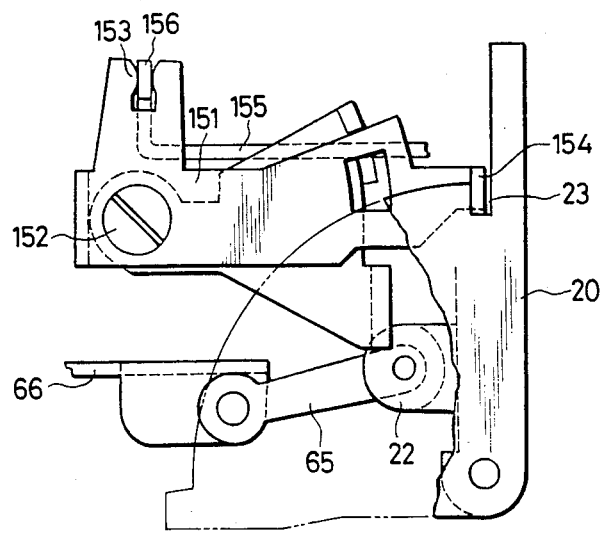
FIG. 13 shows a side view of the door locking mechanism of the magnetic tape drive machine.

As shown in FIGS. 2, 3 and 8, the window 21 of the door 20 is penetrated by an unlocking button 157 when the door is closed. The unlocking button 157 is integrally attached to the front end of a unlocking lever 155, additionally shown in FIG. 13, supported by a guide member 164 so that the unlocking lever 155 can be moved back and forth. A bent rear end portion 156 of the unlocking lever 155 extends upward and then sideward and is fitted in a fork-like portion 153 of a door locking lever 151 supported so that the lever can be turned about a shaft 152 under the fork-like portion 153. A spring (not shown in the drawings) provided in the guide membe 164 urges the unlocking lever 55 to move it forward so that the door locking lever 151 is biased to turn clockwise as illustrated in FIG. 13. The bent front end portion of the door locking lever 151 is located in contact with the side projection 27 of the door 20. When the door 20 is completely closed, the bent front end portion 154 of the lever 151 is engaged in the notch 23 of the door 20.

Figure 11:
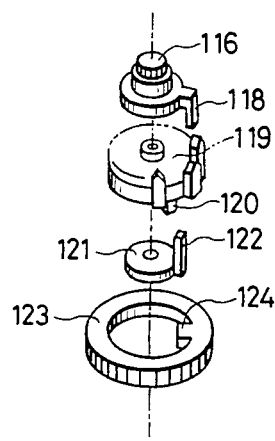
FIG. 11 shows a perspective exploded view of the azimuth adjusting torque transmission mechanism of the magnetic tape drive machine.
Figure 12:
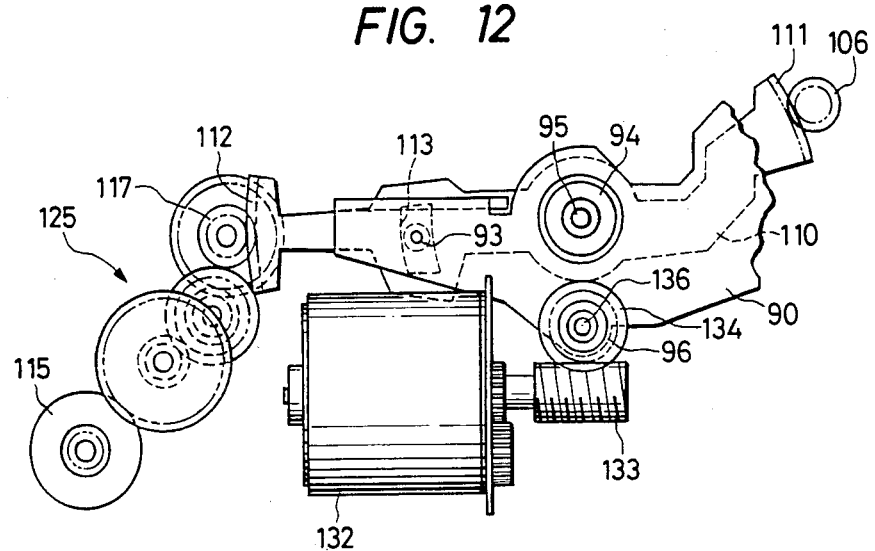
FIG. 12 shows a plan view of the azimuth adjusting mechanism and track switching mechanism of the magnetic tape drive machine.

An azimuth adjusting step motor 115 shown in FIG. 12 is provided at the back left-hand corner of the frame 18. A crown-shaped gear 119, shown in FIG. 11, is press-fitted on the output shaft of the azimuth adjusting motor 115. A restriction gear 123 is secured to the frame 18 under the crown-shaped gear 119. An engaging projection 124 is integrally provided on the inside circumferential surface of the restriction gear 123. As shown in FIG. 2, the restriction gear 123 cannot be rotated while being engaged with an adjusting gear 180 secured to the frame 18.

Returning to FIG. 11, a rotary member 121 is rotatably fitted on the output shaft of the motor 115. Although the rotary member 121 can be turned inside the restriction gear 123, the range of the turning of the rotary member is limited within one revolution because an engaging projection 122 provided on the outside circumferential surface of the rotary member is engaged with the projection 124 of the restriction gear 123.

An engaging projection 120 is provided on the bottom of the crown-shaped gear 119 so that the range of turning of the crown-shaped gear 119 is limited because the projection 120 comes into contact with the engaging projection 122 of the rotary member 121. When the crown-shaped gear 119 is turned by one revolution, its engaging projection 120 comes into contact with the projection 122 of the rotary member 121. When the crown-shaped gear 119 is turned another revolution, the engaging projection 122 of the rotary member 121 comes into contact with the projection 124 of the restriction gear 123 to stop the turning of the crown-shaped gear 119.

An azimuth adjusting transmission gear 116 is provided at the upper end of the output shaft of the crown-shaped gear 119 so that the azimuth transmission gear 116 is rotatable relative thereto. A projection 118 is provided on the outside circumferential surface of the lower portion of the azimuth transmission gear 116 and is engaged between the teeth of the crown-shaped gear 119 so that the azimuth transmission gear 116 is driven together with the crown-shaped gear 119 within two revolution by the motor 115.

The torque of the azimuth transmission gear 116 is transmitted, as shown in FIG. 12, to the final gear 117 of a speed reduction gear train 125. The final gear 117 is engaged with a sector gear 112 provided at one end of an azimuth adjusting lever 110. As shown in FIG. 7, the azimuth adjusting lever 110 is supported under the head plate 90 so that the azimuth adjusting lever 110 can be turned in a horizontal plane about a guide shaft 95 of FIG. 12. Another sector gear 111 is provided at the other end of the azimuth adjusting lever 110 and is engaged with a gear 106, shown in FIG. 7, press-fitted at the lower end of an azimuth adjusting shaft 105. The azimuth adjusting lever 110 has a slender hole 113 extending along an arc whose center of curvature is on the guide shaft 95. The slender hole 113 provides a margin for the movement of a guide shaft 93 provided on the head plate 90.

As shown in FIGS. 3 and 12, an arc-shaped protection 96 is provided on a side of the head plate 90. The lower end of a track adjusting guide shaft 136 secured to the auxiliary plate 130 (refer to FIG. 2) is opposed downward to the projection 96. The guide shaft 136 is provided with a tooth screw portion on which a worm wheel 134 is engaged. The worm wheel 134 is engaged with a worm 133 attached to the output shaft of a step motor 132. The height of the head plate 90 is adjusted by the bottom of the worm wheel 134. The step motor 132 acts to perform track switching (for example, 96 steps for 1 track) and tracking servo operation (several steps).

As shown in FIG. 2, a discharge lever 40 is supported at the back end of the insertion passage for the cartridge 10 so that the discharge lever 40 can be turned in a horizontal plane about a vertical shaft 41 located at the right-hand end of the frame 18. A spring 42 urges the discharge lever 40 in such a direction as to turn it to push out the inserted cartridge 10. A sector gear 43, which extends along an arc whose center of curvature is on the vertical shaft 41, is integrally provided on the bottom of the discharge lever 40 and engaged with a gear 44. The torque of the gear 44 is transmitted to a damper 45 through a speed augmentation gear train not shown in the drawings. The damper 45 is made of a conventional speed control mechanism to perform braking to retard the turning of the discharge lever 40 to slowly discharge the cartridge 10.

Loading of the cartridge

The operation of the magnetic tape drive machine is hereafter described.

As shown in FIG. 8, the cartridge 10 is inserted along its longitudinal direction through the cartridge insertion port 26 when the door 20 is open, so that the protective cover 11 is located at the left-hand side of the inner portion of the cartridge 10. When the cartridge 10 is inserted, it pushes the locking member 30 on the locking plate 28 to turn the plate 28 against the resilient force of the plate spring 39 to temporarily put the locking member 30 out of the cartridge insertion passage. At that time, the riser 32 of the intermediate lever 34 enters into the notch of the side arcuate projection 25 of the door 20 to hinder the closure of the door. The middle arcuate projection 24 comes into contact with the projection 31 of the locking plate 28 shown in FIG. 3, to hinder the closure of the door 20. The cartridge 10 is guided and supported by the guides 53, 54 and 55 of the cartridge guide plate 50.

When the inner end of the cartridge 10 comes into contact with the tip of the discharge lever 40, the lever is pushed by the cartridge 10 so that the discharge lever 40 is turned clockwise (as illustrated in FIG. 2) against the resilient force of the spring 42. Near the end of the insertion of the cartridge 10, the push end 8 of the protective cover 11 comes into contact with the contact surface 61 of the protective cover opening member 57 so that the protective cover 11 is opened. As a result, the head insertion opening 12 is fully opened.

When the cartridge 10 is inserted to a prescribed position so that the outer end of the cartridge is moved beyond the locking member 30 on the locking plate 28, the locking member and the locking plate 28 are returned to the original positions so that the locking member hinders the discharge of the cartridge.

The door 20 is then closed. Consequently, the projections 24 and 25 for hindering the discharge of the cartridge 10 are put under the projection and riser 32 of the locking plate 28 to hinder the turning of the locking plate 28 to keep the locking member 30 from going out of the cartridge insertion passage, to preclude the discharge of the cartridge 10. This operation is performed for the reason described now. Since the magnetic head 100 is moved along the direction of the width of the magnetic tape 13 by the opening and closing of the door 20 as described hereinafter, it is required to prevent the trouble that the magnetic head comes into contact with the cartridge 10 when the cartridge is discharged as the magnetic head is in a position facing the cartridge.

Because of the closure of the door 20, the head lift cam lever 66 is moved backward through the interlocking shaft support 22 and the rod 65. Consequently, the pin 81 is pushed up by the cam groove 71 to turn the head lift lever 78 upward and turn the other head lift lever 83 temporarily coupled to the head lift lever 78. Because of the turning of the lever 83, the pin 87 thereon pushes up the head plate 90. At that time, the head plate 90 is moved up while being guided by the guide shafts 93 and 95, and the magnetic head 100 attached to the head plate is moved up along the direction of the width of the magnetic tape 13 in the cartridge 10 so that the magnetic head comes in between the protective cover 11 of the cartridge and the cartridge insertion opening 12. The upward movement of the magnetic head 100 is hindered because the projection 96 of the head plate 90 comes into contact with the bottom of the worm wheel 134, so as to select a predetermined track of the magnetic tape with which the magnetic head 10 is to be put in slip contact. The turning of the head lift lever 78 is stopped because the pin 81 reaches the upper horizontal portion of the cam groove 71.

Near the end of the closure of the door 20, the projection 68 of the head lift cam lever 66 pushes the pin 148 to turn the cartridge guide plate drive lever 140 against the auxiliary lever 145 and the spring 147. The drive lever 140 translates the cartridge guide plate 50 leftward through the action of the spring 141 as shown in FIGS. 2 and 3, so that the cartridge 10 supported by the cartridge guide plate 50 is also translated leftward. Because of the translation of the cartridge 10, the magnetic tape 13 exposed at the head insertion opening 12 is located in slip contact with the magnetic head 100 facing the cartridge 10. Because of the translation of the cartridge guide plate 50, the cam groove 59 is moved relative to the projection 60 to turn the protective cover opening member 57 in such a direction as to slightly depart from the protective cover 11. As a result, the protective cover 11 is slightly turned in the closing direction. For that reason, the clear space required for the opening of the protective cover 11 is reduced to decrease the width of the magnetic tape drive machine.

Because of the lateral translation of the cartridge 10, the capstan roller 16 is brought into pressure contact with the capstan 161. The magnetic tape 13 is run by the rotation of the capstan motor 160 to perform recording or reproduction through the magnetic head 100.

Because of the closure of the door 20, its side projection 27 pushes up the bent portion 154 of the door locking lever 151 to turn the lever against the biasing force of the unlocking lever 155. At the end of the closure of the door, the bent portion 154 enters into the notch 23 of the door 20 due to the turning of the door locking lever 151 caused by the urging force of the unlocking lever 155, to lock the door. At that time, the unlocking button 157 slightly projects out of the window 21 of the door 20.

Discharge of the cartridge

When the cartridge 10 is to be discharged, the unlocking button 157 is first pushed to move the unlocking lever 155 inward against the biasing force so as to turn the door locking lever 151 counterclockwise (as illustrated in FIG. 13) so that the bent portion 154 of the lever 151 goes out of the notch 23 of the door 20. The pin 148 pushes the projection 68 of the head lift cam lever 66 due to the turning force of the auxiliary lever 145 based on the spring 147. As a result, the door 20 receives a force in such a direction as to open the door. Therefore, the door 20 is opened but stops half-way. Because of the movement of the head lift cam lever 66, the slope 69 pushes the roller 143 to return the cartridge guide plate 50 to translate the cartridge 10 rightward and then to stop it.

When the door 20 is further opened, the head lift cam lever 66 is pulled forward to push down the pin 81 by the cam groove 71 of the lever 66 to turn the head lift lever 78 downward. At the same time, the other head lift lever 83 is also turned to move down the head plate 90 so that the magnetic head 100 on the head plate descends. The magnetic head 100 is thus moved along the direction of the width of the magnetic tape 13 so that the magnetic head is put out of the position facing the cartridge 10.

When the door 20 is fully opened, the projection 35 of the door pushes up the arm 48 of the intermediate lever 34 to turn the lever about the fulcrum 36. Because of the turning of the lever 34 its rear end pushes the locking plate 28 to turn the plate against the plate spring 39 to put the locking member 30 out of the passage for the cartridge 10. As a result, the discharge lever 40 is pushed by the urging force of the spring 42 so that the cartridge 10 is discharged. At that time, the damper 45 acts to slowly discharge the cartridge 10.

Automatic adjustment of azimuth

The azimuth of the magnetic head 100 is detected in a conventional method while the cartridge 10 is loaded in a prescribed recording/reproduction position. The azimuth adjusting step motor 115 is rotated on the basis of a signal generated by the detection of the azimuth. Because of the rotation of the motor 115, the azimuth adjusting transmission gear 116 is turned as hereinbefore described with reference to FIG. 11. As a result, the final gear 117 is rotated through the speed reduction gear train 125 shown in FIG. 12. The torque of the final gear 117 is transmitted to the sector gear 112 on the azimuth adjusting lever 110 to turn the lever about the shaft 95. As a result, the sector gear 111 on the lever 110 turns the gear 106. Since the gear 106 is integrally provided on the azimuth adjusting shaft 105, the shaft is turned so that it is moved up or down along the nut 104 to adjust the height of one end of the head support 105 to modulate the inclination of the magnetic head 100. The azimuth of the magnetic head is thus adjusted.

Switching of tracks

The track of the magnetic tape 13 is switched to another one by turning a track switching step motor 132 on the basis of a track position detection signal. Because of the turning of the step motor 132, a worm 133 is turned to rotate the worm wheel 134. Since the worm wheel 134 is screw-engaged on the screw portion of the track switching guide shaft 136 as hereinbefore described with reference to FIG. 12, the worm wheel 134 is moved up or down along the shaft 136 due to the rotation of the worm wheel 134. For that reason, the height of the bottom of the worm 134 is altered to change that of the head plate 90 to vary the height of the magnetic head 100 to thereby switch the track of the magnetic tape 13. The step motor 132 is also subjected to tracking servo operation to finely adjust the position of the track.

As described above, the magnetic head 100 is supported movably along the direction of the width of the magnetic tape 13 and is located in a more internal position than the tape drive motor 160 with regard to the cartridge insertion port 26. For that reason, a mechanism for opening and closing the protective cover 11 of the cartridge 10 is simplified although the cartridge is inserted in its longitudinal direction into the magnetic tape drive machine as the protective cover is located at the inner portion of the cartridge. Since the magnetic head 100 is moved along the direction of the width of the magnetic tape 13, a space for moving the magnetic head is reduced and a mechanism for moving the magnetic head is simplified.

The present invention consists of those elements described in the claims. The azimuth adjusting mechanism, the track position adjusting mechanism and so forth are not essential to one aspect of the present invention.

According to the present invention, a magnetic head is moved along the direction of the width of a magnetic tape, to a position not facing a cartridge, when the cartridge is inserted and discharged. For that reason, the cartridge does not come into contact with the magnetic head. As a result, the design of a magnetic tape drive machine can be simplified.

Since not only the magnetic head is moved along the direction of the width of the magnetic tape to the position not facing the cartridge, at the time of the insertion and discharge of the cartridge, but also the magnetic head is located in a more internal position than is the tape drive motor with regard to a cartridge insertion port, a mechanism for opening and closing the protective cover of the cartridge can be simplified even if the cartridge is inserted in the longitudinal direction thereof as the protective cover is located at the inner portion of the cartridge.

Since the magnetic head is moved along the direction of the width of the magnetic tape, a space for moving the magnetic head can be reduced and a mechanism for moving the magnetic head can be simplified.

What is claimed is:

1. A magnetic tape drive machine for a magnetic tape fitted into a cartridge, comprising:
    a drive roller for running a magnetic tape fitted into a cartridge when said cartridge is located at a recording/reproducing position in said magnetic tape drive machine;
    a magnetic head having a tape contacting surface which can be brought into contact with said tape to record or reproduce information;
    a support for supporting said magnetic head along a direction of a width of said tape;
    moving means for moving said support along said direction of said width of said tape so that said magnetic head contacting surface moves from a position not facing said magnetic tape when said cartridge is not located at said recording/reproducing position to another position facing said magnetic tape when said cartridge is located at said recording/reproducing position.

2. A magnetic tape drive machine is recited in claim 1, further comprising:
    a housing having a port for inserting said cartridge; and
    a motor for driving said drive roller, said motor being located between said magnetic head and said inserting port in a direction extending inwardly from said inserting port.

3. A magnetic tape drive machine as recited in claim 2, wherein said drive roller is located between said magnetic head and said inserting port.

4. A magnetic tape drive as recited in claim 2, further comprising:
    a door movable between a position opening said port and a position closing said port; and
    means operatively connected to said door for causing said support moving means to move said support in said direction of said width of said tape so that said magnetic head faces said magnetic tape when said door is moved to said closing position from said opening position.

5. A magnetic tape drive as recited in Claim 1, further comprising:
    a housing having a port for inserting said cartridge;
    a door movable between a position opening said port and a position closing said port; and
    means operatively connected to said door for causing said moving means to move said support in said direction of said width of said tape so that said magnetic head faces said magnetic tape when said door is moved to said closing position from said opening position.

6. A magnetic tape drive machine as recited in claim 1, further comprising means for moving said cartridge in a direction of a thickness of said tape at said recording/reproducing direction whereby said magnetic head is brought into contact with said tape.

7. A magnetic tape drive machine as recited in claim 6, further comprising:
    a housing having a port for inserting said cartridge;
    a door movable between a position opening said port and a position closing said port; and
    means operatively connected to said door for causing said cartridge moving means to move said cartridge so that said magnetic head contacts said magnetic tape when said door is moved to said closing position.

8. A magnetic tape drive machine as recited in claim 1, further comprising:
    a door movable between a position closing said insertion port and position opening said insertion port; and
    means connecting said door and said support moving means for causing said support to move said magnetic head in said direction of said width of said tape to a position facing said magnetic tape when said door is closed.

9. A magnetic tape drive machine for a cartridge containing a magnetic tape and having a protective cover over said tape near a corner thereof and opening about an axis transverse to principal sides of said cartridge, comprising:

a housing having a cartridge insertion port for receiving said cartridge along a longitudinal direction thereof with said protective cover being located at an inward end of said cartridge with respect to said insertion port;

opening means coming into contact with said protective cover when said cartridge is received in said housing for opening said protective cover;

a magnetic head having a tape contacting surface for contacting at a recording/reproducing position said magnetic tape when said protective cover has been opened;

a support for movably supporting said magnetic head along a direction of a width of said tape received in said housing;

magnetic head moving means for moving said magnetic head along said direction of the width of said received tape wherein said tape contacting surface is moved from a position not facing said tape at the recording/reproducing position when said cartridge is being received into said housing or being discharged from said housing to another position facing said tape at the recording/reproducing position when said cartridge is substantially fitted into said housing; and cartridge moving means for moving said cartridge toward said magnetic head along a direction of a thickness of said received tape, whereby said magnetic head contacts said tape.

10. A magnetic tape drive as recited in claim 9, wherein said opening means cooperate with said cartridge moving means so that said protective cover is partially closed from a larger opening state by said opening means when said cartridge moving means moves said cartridge toward said magnetic head.

11. A magnetic tape drive as recited in claim 9, further comprising:

a door movable between a position closing said insertion port and a position opening said insertion port; and means connecting said door and said magnetic head moving means for causing said magnetic head moving means to move said magnetic head to a position facing said magnetic tape when said door is closed.

* * * * *